United States Patent
Eadie et al.

[11] Patent Number: 5,122,258
[45] Date of Patent: Jun. 16, 1992

[54] INCREASING VI OF LUBE OIL BY HYDROTREATING USING BULK NI/MN/MO OR NI/CR/MO SULFIDE CATALYSTS PREPARED FROM LIGATED METAL COMPLEXES

[75] Inventors: Donald T. Eadie, North Vancouver; Michael A. Fefer, Whitby, both of Canada

[73] Assignee: Exxon Research and Engineering Company, Florham Park, N.J.

[21] Appl. No.: 700,816

[22] Filed: May 16, 1991

[51] Int. Cl.$^5$ ............... C10G 47/02; C10G 45/08; B01J 27/051
[52] U.S. Cl. ............... 208/112; 208/215; 208/254 H; 502/220
[58] Field of Search ............... 208/112, 215, 254 H; 502/220

[56] References Cited

U.S. PATENT DOCUMENTS

| | | | |
|---|---|---|---|
| 4,528,089 | 7/1985 | Pecoraro et al. | 208/216 |
| 4,591,429 | 5/1986 | Ho et al. | 208/254 |
| 4,595,672 | 6/1986 | Ho et al. | 208/143 |
| 4,622,128 | 11/1986 | Young et al. | 208/18 |
| 4,626,339 | 12/1986 | Chianelli et al. | 208/18 |
| 4,632,747 | 12/1986 | Ho et al. | 208/18 |
| 4,650,563 | 3/1987 | Jacobson et al. | 208/108 |
| 4,663,023 | 5/1987 | McCandlish et al. | 208/112 |
| 4,668,376 | 5/1987 | Young et al. | 208/108 |
| 4,698,145 | 10/1987 | Ho et al. | 208/18 |
| 4,705,619 | 11/1987 | McCandlish et al. | 208/112 |
| 4,716,139 | 12/1987 | Jacobson et al. | 502/167 |
| 4,721,558 | 1/1988 | Jacobson et al. | 208/108 |
| 4,902,404 | 2/1990 | Ho et al. | 208/57 |

Primary Examiner—John Niebling
Assistant Examiner—P. L. Hailey
Attorney, Agent, or Firm—Joseph J. Allocca

[57] ABSTRACT

Lube oils of increased VI are prepared by hydrotreating using bulk Ni/Mn/No or Cr/Ni/Mo sulfide catalysts prepared from ligated, e.g., ethylene diamine, metal complexes. In particular the Ni/Mn/Mo sulfide catalyst is prepared from the oxide, precursor with subsequent sulfiding while the Cr/Ni/Mo sulfide catalyst is prepared from the sulfide precursor in the presence of $H_2S/H_2$.

4 Claims, 1 Drawing Sheet

FIG. 1

INCREASING VI OF LUBE OIL BY HYDROTREATING USING BULK NI/MN/MO OR NI/CR/MO SULFIDE CATALYSTS PREPARED FROM LIGATED METAL COMPLEXES

DESCRIPTION OF THE INVENTION

The Viscosity Index of lubricating and speciality oils can be increased by hydrotreating said oil employing as the hydrotreating catalyst a bulk Ni/Mn/Mo or Cr/Ni/Mo sulfide catalyst prepared from ligated, e.g. ethylene diamine metal complexes wherein the Ni/Mn/Mo sulfide catalyst is prepared from the oxide precursor with subsequent sulfiding while the Cr/Ni/Mo sulfide catalyst is prepared from the sulfide precursor in the presence of $H_2S/H_2$.

BACKGROUND OF THE INVENTION

Raffinate hydrotreating and hydrocracking processes to produce lube stocks are well known. In general, these processes employ catalysts which comprise metal oxides or sulfides supported on alumina or silica-alumina. Metals usually include nickel, molybdenum, cobalt, manganese, tungsten, etc. and mixtures thereof in the oxide or sulfide state. When the catalyst is in the oxide state the environment of use being one containing sulfur containing species converts the metal oxides into metal sulfides.

The objectives in the hydrotreater are to increase VI and saturates levels. Catalysts used today in lubes hydrotreating do not perform this function very well insofar as they are employed principally for hydrodesulfurization, hydrodenitrogenation, color improvement and residual extraction solvent removal. High pressure hydrocracking of distillates or deasphalted oil is an acknowledged alternative to solvent extraction and, in the case of distillate hydrocracking all of the VI increase, saturates increase and aromatics decrease are achieved by the catalytic conversion.

The major reactions which contribute to VI increase are of the ring opening type, whether the ring is aromatic or cyclic saturated Hydrogenation will contribute to a lesser degree to VI increase. At low severity, hydrodesulfurization will give a 3–4 VI unit increase, most likely the result of ring opening that occurs with the hydrodesulfurization of thiophenic structures.

U.S. Pat. No. 4,650,563 teaches molybdenum and/or tungsten hydrotreating catalysts prepared from promoter metal thiomolybdate and/or thiotungstate complexes and their use as hydrotreating catalysts. The catalysts are prepared by heating one or more catalyst precursors under oxygen-free conditions in the presence of sulfur at a temperature of at least about 150° C. The catalyst precursors will be one or more compounds of the formula $(ML)(Mo_y W_{1-y} S_4)$ wherein M comprises one or more divalent promoter metals selected from the group consisting of Ni, Co, Zn, Cu and mixtures thereof, wherein y is any value ranging from 0 to 1 and wherein L is one or more neutral, nitrogen containing ligands at least one of which is a chelating polydentate ligand. L may be ethylene diamine.

U.S. Pat. No. 4,716,139 teaches a catalyst composition comprising an amorphous sulfide of trivalent chromium and at least one metal selected from the group consisting of (a) molybdenum, tungsten and mixtures thereof and (b) mixtures of (a) with iron, nickel, cobalt, manganese, copper, zinc and mixtures thereof. The catalyst is prepared by heating one or more precursors at a temperature of at least about 200° C. under oxygen-free conditions in the presence of sulfur, wherein said precursor is selected from the group consisting of and mixtures thereof wherein M is one or more divalent promoter metals selected from the group consisting of Mn, Fe, Co, Ni, Cu, Zn and mixtures thereof, wherein L is one or more neutral nitrogen-containing ligands, wherein ligand X is a singly-charged anionic species such as $NO_2^-$, $OH^-$, $Cl^-$, etc. and wherein $1 > z \geq 0.1 - z \geq y \geq 0$ and wherein n equals $(3-z-y)/2$. The catalysts are good hydroprocessing catalysts, particularly hydrotreating catalysts. These catalysts were demonstrated for their HDS and HDN ability on light catalytic cycle oil (LCCO).

See also U.S. Pat. No. 4,626,339 which teaches the supported version of the catalyst of '139.

U.S. Pat. No. 4,663,023 teaches hydrotreating with self promoted molybdenum and Tungsten sulfide catalysts. Catalysts are made from precursors which are one or more compounds of the formula $ML(Mo_y W_{1-y} O_4)$ wherein M is one or more promoter metals selected from the group consisting essentially of Mn, Fe, Co, Ni, Cu, Zn and mixtures thereof $0 \leq y \leq 1$ and L is a neutral nitrogen containing ligand. This patent would, therefor, embrace Mn/Ni/Mo sulfide and Ni/Mo sulfide catalysts. The patent claims the use of these catalysts in general to hydrorefine hydrocarbon feeds including lube oils.

U.S. Pat. No. 4,698,145 teaches the upgrading of hydrocarbon feeds by use of a supported self-promoted catalyst. The catalyst is prepared by heating a composite of support material and one or more catalyst precursor salts under oxygen-free conditions and in the presence of sulfur. The precursor salt or salts are of the general formula $(ML)(Mo_y W_{1-y} S_4)$ wherein M is one or more promoter metals selected from the group consisting essentially of Mn, Fe, Co, Ni, Zn and mixtures thereof, $0 \leq y \leq 1$, and L is a neutral, nitrogen containing ligand. This patent would, therefore, embrace supported Mn/Ni/Mo sulfide and supported Ni/Mo sulfide catalysts. The claims recite lube oil as one of the hydrocarbon feeds treated using this class of catalysts in general.

U.S. Pat. No. 4,595,672 is directed to a method for making self-promoted sulfide hydrotreating catalysts. The catalysts are made from precursors which are one or more compounds of the formula $ML(Mo_y W_{1-y} O_4)$ where M is one or more promoter metals selected from the group consisting essentially of Mn, Fe, Co, Ni, Cu, Zn and mixtures thereof an $0 \leq y \leq 1$. This patent would, therefore, embrace Ni/Mn/Mo sulfide and Ni/Mo sulfide catalytic materials. L is a neutral nitrogen containing ligand.

U.S. Pat. No. 4,668,376 teaches supported Mn sulfide promoted Mo and W sulfide hydroprocessing catalysts. The catalysts are made from thiometallate precursor salts of the formula $(ML)(Mo_y-W_{131\ y}S_4)$ where M comprises one or more divalent promoter metals selected from Mn and mixtures of Mn with one or more of Ni, Co, Cu, Zn or mixtures thereof any $0 \leq y \leq 1$ and L is a neutral nitrogen containing ligand. This patent would, therefore, embrace Ni/Mn/Mo sulfide and Ni/Mo sulfide catalytic materials. The patent claims the use of these catalysts in general for hydrorefining hydrocarbon feeds including lube oils.

U.S. Pat. No. 4,591,429 teaching hydroprocessing of hydrocarbon feeds employing supported sulfided catalyst. The catalyst comprises a sulfide of (1) chromium, (2) Mo, W or mixtures thereof and (3) at least one metal selected from the group consisting of Ni, Co, Mn, Cu, Zn and mixtures thereof, and mixtures thereof with Fe. The catalysts are made by compositing a preselected quantity of support material with a precursor comprising a mixture of (1) hydrated oxide of trivalent chromium and (2) a salt containing a thiometallate anion of Mo or W and a cation comprising at least one divalent promoter metal. This patent would, therefore, embrace supported Cr/Ni/Mo sulfide catalyst and claims the use of these catalyst in general for hydroproces sing hydrocarbon feeds, including lube oil.

DETAILED DESCRIPTION OF THE INVENTION

Lubricating and/or specialty oil stocks such as deasphalted oil stocks, lube oil distillates, and solvent extracted lube oil raffinates can have their viscosity indexes increased by hydrotreating, employing specific bulk metal sulfide hydrotreating catalysts selected from the group consisting of bulk Cr/Ni/Mo sulfide catalyst, bulk Ni/Mo/Mn sulfide catalyst and mixtures thereof wherein the catalysts are prepared from specific metal complexes and wherein the Ni/Mn/Mo sulfide catalyst is prepared from the oxide precursor decomposed in an inert atmosphere such as $N_2$ and subsequently sulfided using $H_2S/H_2$ and the Cr/Ni/Mo sulfide catalyst is prepared from the sulfide precursor and decomposed in a non-oxidizing, sulfur containing atmosphere.

These two catalyst have been found to significantly and, surprisingly, to a higher degree than other catalysts, increase the Viscosity Index of lube oil stocks. The feed stocks are contacted with the catalyst under hydrotreating conditions comprising temperatures in the range of about 200° to 450° C., preferably about 300° to 380° C., pressures in the range of about 300 to 3000 psi, preferably at least about 1000 psi, space velocity in the range of about 0.1 to 5.0 v/v/hr., preferably about 0.5 to 2.0 v/v/hr. and a treat gas rate in the range of about 200 to 20,000 SCF $H_2$/bbl, preferably about 700 to 5,000 SCF $H_2$/bbl.

The catalysts are prepared by using $[Ni(L)_3](Mn(L)_3)[MoO_4]_2$ or $[Ni(L)_3][Cr(L)_3][MoS_4]_{2-2.5}$ as precursor complexes, where L = one or more neutral, nitrogen containing ligands at least one of which is a chelating polydentate ligand such as ethylenediamine. These complexes are prepared by reaction of appropriate metal salts with the ligand solution.

The ligand or ligands L will generally have a denticity of six and will be one or more neutral, nitrogen containing ligands wherein at least one of said ligands is a multi-dentate chelating ligand which chelates the metal cation of the metal salt to form a chelated metal species such as $[ML]^{2+}$, where M is Ni or Cr and Mn.

Those skilled in the art know that the term "ligand" is used to designate functional coordinating groups which have one or more pairs of electrons available for the formation of coordinate bonds. Ligands that can form more than one bond with a metal ion are called polydentate while ligands that can form only one bond with a metal ion are called monodentate. Monodentate ligands are not capable of forming chelates. Hence, if one uses one or more species of monodentate ligands in the precursor molecule, then one must also use at least one polydentate chelating ligand. Preferably L will be one or more polydentate chelating ligands. The denticity of the ligand L will generally be six, because the promoter metal cations prefer six-fold coordination. Hence, if more than one species of ligand is employed in the precursor molecule, the denticity of the ligand species will usually add up to six. It should be understood that it is possible for ligand L to have a total denticity of less than six, but in most cases L will have a total denticity of six. Thus, L will be three bidentate ligands, two tridentate ligands, a mixture of a bidentate and a quadridentate ligand, a hexadentate ligand or a mixture of a polydentate ligand with monodentate ligands so long as the combination has a total denticity of six. As has heretofore been stated, it is preferred to use chelating bidentate and tridentate ligands. In general, the ligands useful in this invention include alkyl and aryl amines and nitrogen heterocycles. Illustrative but non-limiting examples of ligands useful in the catalyst precursors of this invention are set forth below.

Monodentate ligands will include $NH_3$ as well as alkyl and aryl amines such as ethyl amine, dimethyl amine, pyridine, etc. Useful chelating bidentate amine ligands are illustrated by ethylenediamine, 2,2,-bipyridine, o-phenylene diamine, tetramethylethylenediamine and propane-1,3 diamine. Similarly, useful chelating tridentate amine ligands are represented by terpyridine and diethylenetriamine while triethylenetetramine is illustrative of a useful chelating quadridentate amine ligands. Useful chelating pentadentate ligands include tetraethylenepentamine while sepulchrate (an octazacryptate) is illustrative of a suitable chelating hexadentate ligand. However, as a practical matter it will be preferred to use chelating, polydentate alkyl amines for L. Illustrative, but not limiting examples of alkyl amines that are useful in the catalyst precursor of this invention include ethylenediamine, diethylenetriamine, and tetraethylenetetramine. It is particularly preferred to use bidentate and tridentate alkyl amines such as ethylenediamine, (en) and diethyleneriamine, (dien).

Many of the precursor salts useful in forming the catalysts of this invention and methods for preparing them are known in the art. An article by Diemann and Mueller titled Thio and Seleno Compounds of the Transition Metals With $d^o$ configuration published in COORD. CHEM. REV. 10:79-122 provides a review of known salts. In general, the precursor salts useful for forming the catalysts useful in this invention may be prepared by mixing an aqueous solution of ammonium thiomolybdate with an aqueous solution of the chelated promoter metal cation $[ML]^{2+}$ which results in the formation of the precursor salt as a precipitate which is readily recovered. The chelating promoter cation is easily formed by, for example, mixing an aqueous solution of one or more water soluble promoter metal salts with the ligand or mixture of ligands. The water soluble salt may be any water soluble salt that is convenient to use such as a halide, sulfate, perchlorate, acetate, nitrate etc. Alternatively, an aqueous solution of ammonium thiomolybdate may be mixed with the ligand with the resulting solution mixed with an aqueous solution of promoter metal salt or the salt can be added to the ligand and dissolved into the solution of thiomolybdate and/or thiotungstate. However, it should be understood that the catalyst precursor preparation is not intended to be limited to aqueous media.

The [Ni(L)$_3$](Mn(L)$_3$)[MoO$_4$]$_2$ precursor is converted into the bulk catalyst by decomposing the precursor complex under inert conditions, such as in the presence of N$_2$ or an inert gas at 300° to 400° C. The decomposed material is subsequently sulfided using H$_2$S/H$_2$ at 200° to 600° C., preferably 250–500 C., most preferably 200-400.C. A preferred ligand is ethylene diamine.

The [Ni(L)$_3$](Cr(L)$_3$)[MoS$_4$]$_{2-2.5}$ precursor is converted into the bulk sulfide catalyst by decomposing the precursor complex in a sulfur containing atmosphere at least 150° C., preferably at least about 200° C. for a time sufficient to form the catalyst. A preferred ligand is ethylenediamine.

The sulfur required during the formation of the catalyst may be that which is present in the precursor salt. Thus, the Ni/Cr/Mo catalyst composition used in this invention will be formed if no excess sulfur is present and if the oxygen-free atmosphere is relatively inert, such as nitrogen. It is preferred that the sulfur will be present in an amount in excess of that contained in the precursor salt. It is preferred that the catalyst be formed by heating the precursor in the presence of excess sulfur, it is also preferred that the excess sulfur be present in the form of a sulfur bearing compound which can be one or more solids, liquids, gases or mixtures thereof. Mixtures of hydrogen and H$_2$S have been found to be particularly suitable. In general the temperature will range between from about 150°–600° C., preferably 250°–500° C., and still more preferably from about 300°–400° C. The non-oxidizing atmosphere may be gaseous, liquid or mixture thereof.

These bulk metal sulfide catalysts are relatively low surface area materials of about 50m$^2$/gram.

The catalyst is prepared in a two step operation. Appropriate salts of Ni, Cr, and Mn are reacted in the presence of excess ligand in combination with MoS$_4{}^{2-}$ or MoO$_4{}^{2-}$. Methanol is used as the solvent. One recovers either (Ni(L)$_3$)(Cr(L)$_3$(MoS$_4$)$_{2.0-2.5}$ (Ni(L)$_3$)(Mn(L)$_3$)(MoO$_4$)$_2$ which are then decomposed as previously described.

The bulk metal sulfide catalysts are most conveniently used as shaped pellets or extrudates. The bulk metal sulfide can be pelleted by the application of extremely high pressure. Bulk metal sulfide catalyst pellets have been prepared using what is believed to be this high pressure technique but the details are not known. Another technique involves preparing the bulk metal sulfide in the presence of colloidal silica or colloidal alumina, recovering the precipitate, drying, and grinding the recovered cake and pelletizing using polyvinyl alcohol, in accordance with the procedure of U.S. Pat. No. 4,650,563 and U.S. Pat. No. 4,591,429. It is possible that a preferred bulk metal sulfide catalyst pellet or extrudate is produced without the use of any silica or alumina solely by employing standard, commercial high pressure pelleting, but economics and cost effectiveness will become important issues.

Experimental

Five bulk metal sulfide catalysts were evaluated for raffinate hydrotreating to determine their effect on VI improvement. These catalysts were:
1) Ni$_{0.5}$ Cr$_{0.5}$ Mo (from thiomolybdate)
2) Ni$_{0.5}$ Mn$_{0.5}$ Mo (from thiomolybdate)
3) NiW (from thiotungstate)
4) Ni$_{0.5}$ Mn$_{0.5}$ Mo (from molybdate)
5) CoMo (from molybdate)

These bulk materials were pelleted using high pressure without any silica or alumina binder material. The pelleted material was then crushed and sieved to secure particles of about 1/16 inch.

The following are representative of typical procedures used to produce materials of the type identified above. They are not offered as recitations of the exact, specific procedures used to produce the particular materials hereinafter identified.

Typical Preparation of
NiMn(NH$_2$CH$_2$CH$_2$NH$_2$)$_6$(MoO$_4$)$_2$ With Subsequent Sulfiding 88.2g (NH$_4$)$_6$Mo$_7$O$_{24}$.4H$_2$O were dissolved in 200 ml H$_2$O plus 100 ml ethylenediamine. 72.2g Ni(NO$_3$)$_2$.6-H$_2$O and 49.5g MnCl$_2$.4H$_2$O were dissolved in 800 ml deaerated (N$_2$ bubbler) methanol. The molybdate solution was placed in a 2-liter flask and deaerated with a nitrogen bubbler while stirring with a mechanical stirrer. Under a blanket of N$_2$, the Ni- and Mn-containing solution was added dropwise to the flask from a dropping funnel. A precipitate formed. The precipitate was allowed to settle and the supernatent liquid was siphoned off. Two methanol (deaerated) rinsings were performed, each time siphoning off supernatent-liquid. The precipitate was finally recovered by vacuum filtration from methanol in an N$_2$ atmosphere box. The yield was 87.2%. The catalyst precursor was dried under vacuum at 50° C. overnight.

The precursor was then pelletized into a disk and then crushed into 20/40 mesh granules. Sulfiding of the precursor compound to bulk catalysts was done by heating under nitrogen for 50 minutes to 370° C., holding at 370° C. for one hour, then heating under a stream of 10% H$_2$S in hydrogen for ten minutes to 400° C. and holding at that temperature under H$_2$S/H$_2$ for two hours. Cooling over 1.5 hrs under H$_2$S/H$_2$ to <100° C. was followed by cooling to room temperature under nitrogen and passivation at room temperature with a stream of 1% O$_2$/N$_2$ for half an hour.

Typical Preparation of Cr-Containing Catalysts

Chromium containing catalyst can be prepared via two different chemistries, olation and chelation in non-rigorous terms. The following reported procedures are representative of the typical techniques employed in producing the material from the thiomolybdate.

Via Olation: A Ni$_{0.5}$—Cr$_{0.5}$—Mo catalyst can be prepared as follows: 40g (NH$_4$)$_2$MoS$_4$ was added to 82 ml of diethylenetriamine (dien) in a one liter flask. Distilled H$_2$O was used twice to wash off any solution remaining on the sides of the flask. The resulting dark red solution was cooled to 0° C. in an ice bath and kept in the bath for the duration of the preparation. In a separate flask, 16.52 grams of CrCl$_3$.6H$_2$O and 14.77 gm of NiCl$_2$.6H$_2$O were dissolved into a mixture of 250 ml of distilled H$_2$O and 25 ml of diethylenetriamine to precipitate the hydrated chromium oxide and to chelate the nickel ion. This slurry was allowed to stand for 2-3 hours after which it was slowly added dropwise, to the cold $(NH_4)_2MoS_4$/dien solution with agitation after each addition keeping the flask as cold as possible, which resulted in a bright orange precipitate being formed. The resulting precipitate-containing mixture was stirred in the ice bath for one half hour after the addition was completed. The precipitate was separated out by vacuum filtration through a Buchner funnel. The resulting cake was washed with distilled water, then with ethanol, and dried under vacuum for 16-24 hrs. Eighty-three grams of orange colored precipitate were recovered. This material was sulfided in the same way as was the $NiMn(en)_6(MoO_4)_2$ material, recited above.

Via Chelation: A $Ni_{0.5}$—$Cr_{0.5}$—$Mo_{1.25}$ can be prepared as follows: 38 grams of $(NH_4)_2MoS_4$ was dissolved in 100 ml degassed ethylene diamine and cooled in an ice bath. Previously prepared $[Cr(en)_3]Cl_3$ (16.4 g) and $[Ni(en)_3]Cl_2$ (16.7 g), synthesized in the conventional manner by methanol precipitation from an aqueous solution of $NiCl_2.H_2O$ to which ethylene diamine had been added, were dissolved in a mixture of 150 ml water and 5 ml ethylene diamine. This solution was filtered. The clear filtrate was added dropwise to the $(NH_4)_2MoS_4$ solution with vigorous agitation. A red-orange precipitate formed. After addition was complete the red-orange product was filtered. It was washed with a mixture of 450 ml $H_2O$ and 60 ml ethylene diamine in 3 washes, followed by a 300 ml methanol wash and 100 ml diethylether wash. After vacuum drying the yield was about 45 g. — This material was sulfided in the same way as was the $NiMn(en)_6(MoO_4)_2$ material, recited above.

Typical Preparation of $Ni(en)_3WS_4$ 125 grams of $(NH_4)_2WS_4$ were placed into a two liter flask and 250 cc of ethylenediamine was slowly added. The flask was then placed in an ice bath and cooled to about 0° C. Then a mixture of 86.2 grams $NiCl_2.6H_2O$ (4% excess) in 500 ml distilled water was added dropwise, keeping the flask contents as cold as possible. After all the reactants were combined the flask was left in the ice bath for 1/2 hour. The contents were then vacuum filtered and the solids washed with distilled water and ethanol. The catalyst precursor was pressed into 12-20 mesh granules using a 2.25 inch die at 50,000 psi. 25 grams of the 12-20 mesh $Ni(en)_3WS_4$ was treated with 15% $H_2S$ (balance $H_2$) at 350° C. for 2 hours then cooled and treated with $N_2$ bubbling through $H_2O$ to possibly for 1 hour. The procedure was repeated 4 times, then all the products were combined, re-pelleted and sieved to a 20/40 mesh size.

Typical Preparation of $Co(en)_3MoO_4$ 57.38 grams of $(NH_4)_6Mo_7O_{24}.4H_2O$ was put into a two liter flask and 125 cc of distilled water and 250 cc of ethylenediamine were added. The flask was put into a wet ice bath and cooled to about 0° C. with $N_2$ bubbling through the solution. A solution of 77.38 grams of $CoCl_2.6H_2O$ in 500 ml of methanol (methanol had $N_2$ sparged through it for 1 hr) was added dropwise. After all the reactants were combined the solution was stirred in the ice bath for ½ hour then vacuum filtered under $N_2$ and washed with four 300 ml portions of methanol then put into a vacuum oven with a $N_2$ bleed overnight. This material was sulfided in the same way as was the $NiMn(en)_6(MoO_4)_2$ material, recited above.

Typical preparation of $Ni_{n_{0.5}} Mn_{0.5}(en)_3MoS_4$ 100 grams of $(NH_4)_2 MoS_4$ was placed in a 2 liter flask and 200 cc of ethylenediamine was added slowly after all the ethylenediamine was added the flask was put into a wet ice bath and cooled to about 0° C. with stirring. A mixture of 45.67 gm $NiCl_2.6H_2O$ (1% excess) and 38.40 grams $MnCl_2.4H_2O$ (1% excess) in 500 cc distilled water was then added dropwise. Keeping the mixture as cold as possible after all the mixture was added, the flask was left in the ice bath with stirring for ½ hour then vacuum filtered. The solids were washed with distilled water and ethanol and left overnight under $N_2$. The solids were then dried in a vacuum oven. This material was sulfided in the same way as was the $NiMn(en)_6(MoO_4)_2$ material, recited above.

Test Procedure

Catalysts were tested on a partially dewaxed (+8° C. pour) Isthmus 600N raffinate (82 VI@ −9° C. pour)in a Micro Catalyst Screening Unit (MCSU). In the MCSU, the 1.18 cm ID 347 stainless steel reactor contains a 0.32 cm OD thermowell. The reactor is heated by a Lindberg electric furnace. Typical catalyst bed height is 24 cm (23 ml charge), and the catalyst charge (20-28 mesh size unless stated otherwise) is supported in the hot zone by a 140 μm stainless steel filter. The unit operated isothermally in a down-flow mode, and cannot run waxy feeds. Inlet gas rate is controlled by a Brooks mass flow meter, and reactor pressure is regulated by a 90W valve. The reactors are equipped with quick fit connections allowing them to be withdrawn and catalysts stored under $H_2$ or $N_2$ pressure, and reinstalled later if desired. Operation is normally during regular working hours only. At the start of a day's run, the sequence of events is: 1) Start feed and hydrogen flow at desired operating pressure. 2) Heat to target reactor temperature as quickly as possible. Sampling from the gas-liquid separator is carried out hourly, with gas and liquid flows and liquid product yield recorded at that time. At the end of the day's operation, the unit is shutdown as follows: 1) Cool down reactor as quickly as possible under gas and liquid flow, to less than 150.C. 2) Bottle up reactor under $H_2$ pressure. Feed characterization data is provided in Table 1. Operating conditions were 8.5 MPa $H_2$; 1.0 LHSV, and treat gas rate of 425 ml/minute (~6200 SCF/B), with activity varied by reactor temperature between 325° and 380° C. Lined out total liquid product from each days run was blended and topped to give 360 C+product in a HIVAC model C still. Operating conditions, yields and product characterizations for each of the five catalysts are contained in Tables 2 to 7. Data for fluorided $Ni/W/Al_2O_3$ catalyst, a high activity hydrocracking/hydrotreating catalyst, available as Shell 454, is included for comparison purposes and reported in detail in Table 2A. The process of the present invention using bulk Ni/Mn/Mo and Ni/Cr/Mo sulfide catalysts is superior for VI increase and, in the case of the Ni/Mn/Mo sulfide catalyst also superior for aromatics saturation as compared to the other catalysts tested, including fluorided $Ni/W/Al_2O_3$. The process of the present invention, by using the recited bulk sulfide catalysts also avoids the use of any fluoriding agent and, therefore, avoids the corrosion associated with the presence of fluoride in hydrotreating and ancillary equipment.

Activation and Fluoriding of Shell 454 Catalyst

The Ni/W/Al$_2$O$_3$ catalyst was activated by a procedure recommended by the vendor, as follows: The 20–28 mesh sized catalyst was calcined at 485° C. for 1 hour prior to loading. Twenty-three cc of catalyst was charged to the MCS unit reactor. Following cold pressure testing with N$_2$ and H$_2$ (8.5 MPa), the reactor was purged with N$_2$ (6 CF/hr) and heated to 420° C., pressure tested at 8.5 MPa, held at these conditions overnight, then cooled to 107° C. Treat gas was changed to 2% H$_2$S in H$_2$, and sulphiding feed was introduced (1.49 g dimethyl disulphide per 100 g CWO base) at maximum pump rate, 4.1 MPa pressure, and 136 ml/min (0.28 CF/hr) treat gas rate. When liquid flow through the separator had been established, feed rate was reduced to 1 LHSV, and the reactor quickly heated to 190° C, held for 3 hours, heated to 330 C at 47.C per hour, held for 1 hour, then cooled to 50 C with gas and liquid flow.

In-situ fluoriding with 2-fluorotoluene is recommended by the catalyst vendor for Shell 454 Ni/W/Al$_2$O$_3$ catalyst using 400–800 ppm fluoride in feed, but detailed procedures were not provided. Fluoride concentration was 1000 wppm (0.575 g 2-fluorotoluene per 100 g CWO base), and process conditions were 360° C., 4.0 LHSV, 8.5 MPa, 5000 SCF/B treat gas rate. Catalyst activity was monitored by changes in Refractive Index. Through the first day of fluoriding, activity rapidly increased. After the overnight shutdown, activity was lower than at the end of the previous day, and increased again through the second day of fluoriding. During the third day, steady performance was observed, and fluoriding was terminated at this point. At the start of each days' run, fluoride containing feed was pumped through the reactor as the temperature was increased from ambient to 360° C., and again as the reactor was being cooled at the end of the days run. The nominal total amount of fluoride added was 1.51 g or 6.8 wt% fluoride on catalyst. It should be noted that product Refractive Index has been found to be an unreliable indicator of catalyst activity for raffinate hydrotreating. In general, the fluoriding procedures have been found to give a large fluoride gradient through the catalyst bed, with a higher concentration at the feed inlet (bottom of bed for upflow operation). The fluoride distribution resulting from the procedures used in these small lab unit (MCS units) experiments is not known at this time.

TABLE 1
FEEDSTOCK CHARACTERIZATION

| Feed Type: | Isthmus 600N 82VI Raffinate |
|---|---|
| Dewaxing Conditions: | 100% MBK, 1.5/1 solvent/al, + 8° C. filter temp. |
| Feed Inspections | |
| Sulfur, wt % | 1.07 |
| Total nitrogen, wppm | 280 |
| Basic nitrogen, wppm | 159 |
| Viscosity @ 40° C., cSt | 130.61 |
| Viscosity @ 100° C., cSt | 12.8 |
| Viscosity Index | 89 |
| Pour Point, °C. | +12 |
| HPLC Separation: | |
| Saturates, wt % | 55.8 |
| Aromatics, wt % | 41.2 |
| Recovery, wt % | 96.9 |
| GCD, °C. | |
| IBP/5 | 329/413 |
| 20/50 | 461/495 |
| 90/95 | 568/563 |

TABLE 1-continued
FEEDSTOCK CHARACTERIZATION

| FBP | 594 |
|---|---|
| Mass Spectral Composition (LV %) | |
| Paraffins | 7.77 |
| Saturates average ring no | 1.74 |
| Alkyl benzenes | 13.37 |
| 2 ring aromatics | 11.03 |
| 3 ring aromatics | 2.18 |
| 4 ring aromatics | 0.69 |

Figure 1:
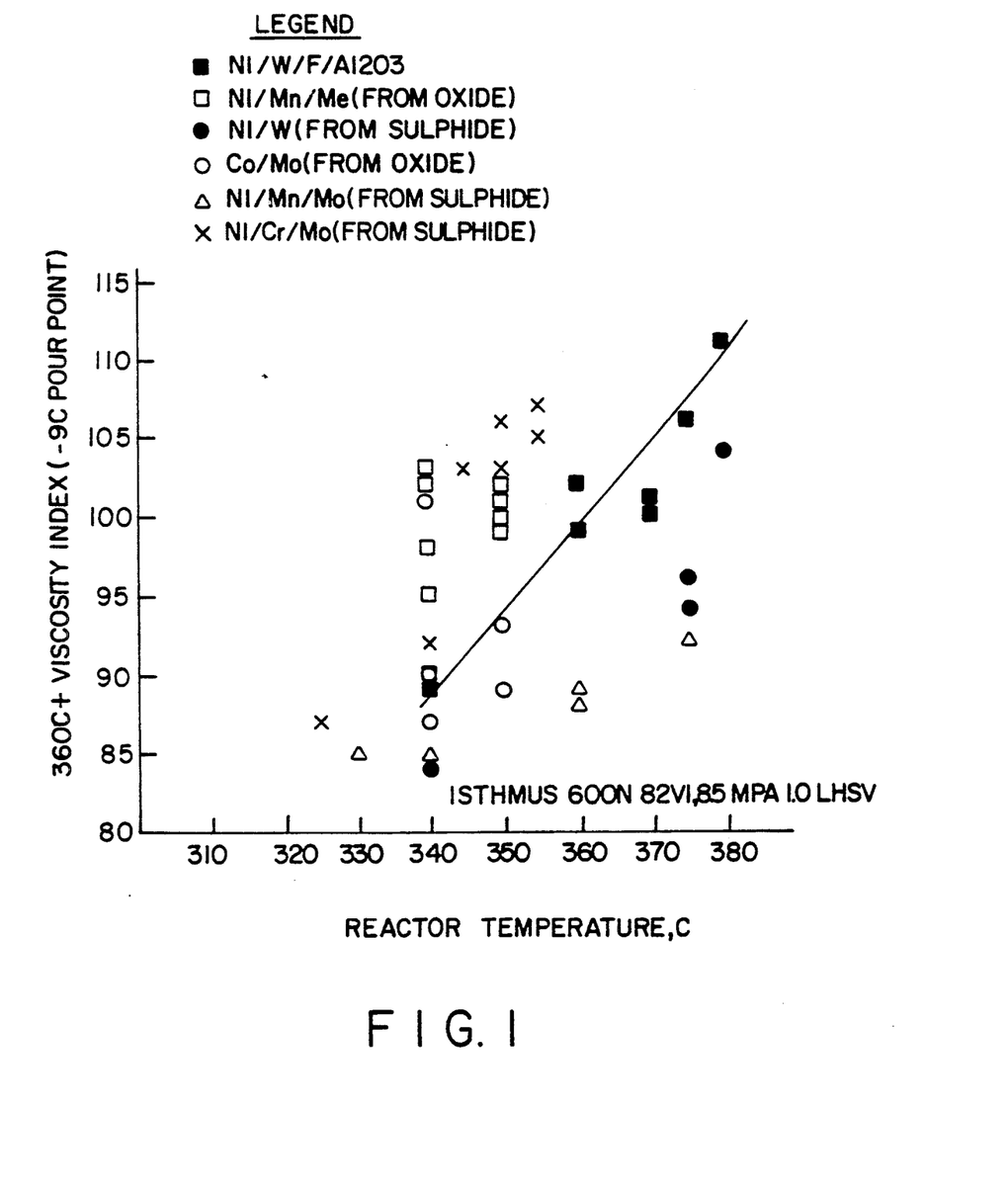
FIG. 1 compares the 360° C.+ product VI as a function of reactor temperature for five bulk metal catalysts and a $Ni/W/F/Al_2O_3$ reference catalyst.

360.C+ product VI as a function of reactor temperature is plotted for the five bulk catalysts in FIG. 1. VI is corrected to −9° C. pour point by subtracting 6 from the measured values in Tables 3–7 (assumes 1 VI unit per 3° C. pour point).

Ni/Mn/Mo (from oxide: molybdate)

The bulk Ni/Mn/Mo sulfide catalyst derived from the oxide shows outstanding start of run activity under these conditions exhibiting the production of oil of high VI at lower temperature than the other catalyst tested with the exception of the Ni/Cr/Mo bulk sulfide derived from the sulfide precursor. The catalyst is about 20° C. more active than Ni/W/3-Al$_2$O$_3$ in achieving the same VI.

The high initial VI (103) obtained at 340° C. gradually declined to 95 VI after 30 hours on oil, and returned to about 102 VI when reactor temperature was increased to 350° C. The plotted runs are those performed at a gas rate of 6200 SCF H$_2$/bbl. The catalyst is also active for aromatics saturation. The catalyst had a BET surface area of 61.7 m$^2$/g.

Ni/Mn/Mo (from sulfide: thiomolybdate)

This material differs nominally from the first catalyst in the source of molybdenum used. This catalyst, however, has very poor activity for both VI increase and aromatics saturation activity as indicated below:

| Catalyst | Ni/Mn/Mo (from oxide) | Ni/Mn/Mo (from sulfide) | Ni/W/F—Al$_2$O$_3$ |
|---|---|---|---|
| Reactor Temp °C. | 340 | 340 | 340 |
| Product VI | 95 | 85 | 89 |
| Product Saturates wt % | 85 | 60 | 72.5 |

This catalyst had a BET surface area of 12.4 m$^2$/g.

Ni/W (from sulphide)

The bulk nickel tungsten sulphide catalyst showed poorer activity for both VI increase and aromatics saturation. This catalyst had a BET surface area of 0.6 m$^2$/g.

Co/Mo (from oxide: molybdate)

For the first eight hours on oil, this catalyst showed very high activity, comparable to the Ni/Mn/Mo (oxide precursor) catalyst. However, activity thereafter declined rapidly to a low level, suggestive of rapid poisoning of the active sites by some feed or product component, or possibly catalyst structural arrangement. This catalyst had a BET surface area of 50 M$^2$/g.

Ni/Cr/Mo (from sulphide: thiomolybdate)

This catalyst also showed very promising activity, as indicated in FIG. 1. Activity for VI increase was similar to that of Ni Mn Mo (from oxide). Whereas the Ni/Mn- /Mo (oxide precursor) catalyst appeared to lose activity somewhat during the course of the evaluation, the Ni/Cr/Mo catalyst activity appeared somewhat steadier. This catalyst showed less aromatics saturation activity than did Ni/Mn/Mo (from oxide: molybdate). This catalyst had a BET surface area of 7.9 $m^2/g$.

TABLE 2

| UNIT/REACTOR/RUN | MCS/116/7 | MCS/113/3 | MCS/105/8 | MCS/111/9 | MCS/111/10 |
|---|---|---|---|---|---|
| Treat Gas | | | 100% $H_2$ | | |
| Operating Mode | | Isothermal, Once-through, downflow | | | |
| Mass Velocity, kg/hr/$m^2$ | | | 210 | | |
| (lb/hr/$ft^2$) | | | (43) | | |
| Length of catalyst bed, cm | 23.3 | 25 | 23.9 | 25 | 23.1 |
| Length of Inert Packing in Hot Zone, cms: | | | | | |
| (A) Above catalyst | 12.5 | 11 | 11.3 | 10.3 | 10.9 |
| (R) Below catalyst | — | — | — | — | — |
| Catalyst | | | | | |
| Type | Ni/Mn/Mo | NiW | CoMo | NiMnMo | Ni/Cr/Mo |
| Precursor Souce | oxide | sulphide | oxide | sulphide | sulphide |
| Catalyst charge, ml | 22 | 23 | 23 | 23 | 23 |
| Catalyst weight, g | 34.5 | 34.8 | 37.7 | 31.5 | 30.1 |
| Catalyst size | 20–30 mesh | 20–30 mesh | 20–30 mesh | 20–30 mesh | 20–30 mesh |

Startup procedure
[1] Ambient temperature pressure test with nitrogen (9 MPa)
[2] Reactor heated to 100° C. under nitrogen purge (6 CF/hr, 1 MPa), held for one hour
[3] Reactor cooled to ambient temperature under nitrogen purge
[4] Pressure tested with hydrogen at ambient temperature (9 MPa)
[5] Cut in feed at ambient temperature, heated to reaction temperature under hydrogen flow (425 ml/min, 8.5 MPa)

TABLE 2A

| OPERATING CONDITIONS, YIELDS AND PRODUCT INSPECTIONS | | | | | | | |
|---|---|---|---|---|---|---|---|
| Catalyst Description | Shell 454, Crushed and Screened to 20–28 mesh, on-stream fluorided | | | | | | |
| Run Number | MCS-113-4 | | | | | | |
| Operating Conditions and Yields | | | | | | | |
| Feed | Isthmus 600N 82 VI Raffinate | | | | | | |
| Feed Rate (LHSV) | 1.0 | | | | | | |
| Gas Rate, SCF/B | | | | | | | |
| Reactor Temp., °C. | 360 | 360 | 370 | 370 | 375 | 380 | 340 |
| Unit Pressure, MPa | 8.5 | | | | | | |
| Catalyst Hours | 16–20 | 23–27 | 30–34 | 37–41 | 44–48 | 51–55 | 58–61 |
| TLP Yield on Feed, wt % | 93.7 | 93.2 | 95.99 | 97.11 | 94.7 | 94.9 | 97.9 |
| 360° C. + Yield on Feed, wt % | 79.4 | 84.0 | 84.4 | 75.91 | 79.5 | 77.1 | 94.3 |
| 360° C. + Product Inspections | | | | | | | |
| Density @ 15° C., kg/$dm^3$ | — | — | — | — | — | — | — |
| Sulphur, wppm | 50 | 18 | 17 | 14 | 7 | 5 | 257 |
| Total Nitrogen, wppm | <1 | <1 | <1 | 1 | 1 | <1 | 16 |
| Viscosity @ 40° C., cSt | 65.87 | 74.47 | 68.44 | 67.62 | 60.33 | 51.80 | 101.24 |
| Viscosity @ 100° C., cSt | 8.84 | 9.50 | 9.02 | 8.99 | 8.48 | 7.81 | 11.14 |
| Viscosity Index | 108 | 105 | 106 | 107 | 112 | 117 | 95 |
| HPLC Separation: | | | | | | | |
| Saturates, wt % | 88.6 | 84.5 | 84.7 | 86.3 | 87.0 | 85.3 | 72.7 |
| Aromatics, wt % | 11.0 | 15.2 | 14.4 | 13.4 | 12.7 | 13.7 | 26.6 |
| Recovery, wt % | 99.6 | 99.7 | 99.2 | 99.7 | 99.7 | 98.9 | 99.3 |

TABLE 3

| OPERATING CONDITIONS, YIELDS AND PRODUCT INSPECTIONS, MCSU | | | | | | | | | |
|---|---|---|---|---|---|---|---|---|---|
| Unit Run # | MCS 116-7 | | | | | | | | |
| Catalyst Description | $Ni_{0.5}Mn_{0.5}Mo$ (from oxide) | | | | | | | | |
| Unit Conditions | | | | | | | | | |
| Feed | 600N 82 VI Raffinate | | | | | | | | |
| Feed Rate (LHSV) | 1.0 | | | | | | | | |
| Gas Rate, SCF/B | 6200 | 6200 | 6200 | 6200 | 6200 | 6200 | 6200 | 6200 | 6200 |
| Reactor Temp., °C. | 340 | 340 | 340 | 340 | 340 | 350 | 350 | 350 | 350 |
| Unit Pressure, MPa | 8.5 | 8.5 | 8.5 | 8.5 | 8.5 | 8.5 | 8.5 | 8.5 | 8.5 |
| Catalyst Hours | 4–6 | 9–13 | 16–20 | 23–27 | 30–34 | 37–41 | 44–48 | 51–55 | 58–62 |
| Total Liquid Product | | | | | | | | | |
| TLP Yield, wt % | 98.1 | 97.5 | 96.2 | 96.5 | 97.2 | 97.4 | 97.5 | 97.4 | 96.7 |
| 360° C. + Yield on Feed, wt % | 83.5 | 85.4 | 84.1 | 87.1 | 89.7 | 77.9 | 85.5 | 85.2 | 84.3 |
| Refractive Index @ 75° C. | 1.4578 | 1.4585 | 1.4584 | 1.4602 | 1.4622 | 1.4600 | 1.4592 | 1.4588 | 1.4588 |
| Hydrogen, wt % by NMR | | | | | | | | | |
| 360° C. + Liquid Product | | | | | | | | | |
| Visc @ 40° C., cSt | 64.17 | 68.56 | 68.20 | 74.29 | 80.94 | 73.24 | 69.32 | 67.08 | 67.10 |
| @ 100° C., cSt | 8.82 | 9.10 | 9.06 | 9.46 | 9.89 | 9.42 | 9.13 | 8.97 | 8.98 |

TABLE 3-continued

OPERATING CONDITIONS, YIELDS AND PRODUCT INSPECTIONS, MCSU

| | | | | | | | | | |
|---|---|---|---|---|---|---|---|---|---|
| Viscosity Index | 109 | 108 | 108 | 104 | 101 | 105 | 107 | 108 | 108 |
| Dohrman Sulphur, wppm | 80 | 26 | 23 | 22 | 44 | 21 | 11 | 7 | 10 |
| X-Ray Sulphur, wt % | — | | | | — | | | — | |
| Total Nitrogen, wppm | 3 | 2 | <2 | <2 | <2 | <2 | <2 | <2 | <2 |
| Basic Nitrogen, wppm | | | | | | | | | — |
| HPLC Separation | | | | | | | | | |
| Saturates, wt % | 95.2 | 93.0 | 92.7 | 90.2 | 84.4 | 90.7 | 91.3 | 91.5 | 89.7 |
| Aromatics, wt % | 4.8 | 6.7 | 6.5 | 9.4 | 12.8 | 7.9 | 7.5 | 6.3 | 7.7 |
| Recovery, wt % | 100 | 99.7 | 99.2 | 99.6 | 97.2 | 97.6 | 98.8 | 97.8 | 97.4 |

| | | | | | | |
|---|---|---|---|---|---|---|
| Unit Run # | \multicolumn{6}{c}{MSC-116-7} | | | | | |
| Catalyst Description | \multicolumn{6}{c}{$Ni_{0.5}Mn_{0.5}MoS_4$ (from oxide)} | | | | | |
| Unit Conditions | | | | | | |
| Feed | \multicolumn{6}{c}{600N 82 VI Raffinate} | | | | | |
| Feed Rate (LHSV) | \multicolumn{6}{c}{1.0} | | | | | |
| Gas Rate, SCF/B | 6200 | 500 | 500 | 500 | 500 | 6200 |
| Reactor Temp., °C. | 350 | 340 | 340 | 355 | 350 | 350 |
| Unit Pressure, MPa | 8.5 | 4.1 | 4.1 | 4.1 | 4.1 | 8.5 |
| Catalyst Hours | 65–69 | 75–76 | 79–83 | 86–90 | 93–97 | 100–103 |
| Total Liquid Product | | | | | | |
| TLP Yield, wt % | 97.7 | 97.7 | 99.4 | 98.4 | 99.0 | 97.5 |
| 360° C. + Yield on Feed, wt % | 87.0 | 94.6 | 97.2 | 94.5 | 95.2 | 90.8 |
| Refractive Index @ 75° C. | 1.4600 | 1.4717 | 1.4712 | 1.4707 | 1.4690 | 1.4632 |
| Hydrogen, wt % by NMR | — | | | | | — |
| 360° C. + Liquid Product | | | | | | |
| Visc @ 40° C., cSt | — | — | 109.76 | — | 98.15 | — |
| | 70.67 | 118.9 | | 103.54 | | 86.77 |
| @ 100° C., cSt | 9.21 | 11.95 | 11.17 | 11.24 | 10.98 | 10.29 |
| Viscosity Index | 106 | 88 | 85 | 94 | 96 | 100 |
| Dohrman Sulphur, wppm | 11 | — | — | — | — | — |
| X-Ray Sulphur, wt % | | 0.167 | 0.131 | 0.089 | 0.029 | |
| Total Nitrogen, wppm | <2 | 88 | 80 | | | |
| Basic Nitrogen, wppm | — | — | — | — | — | |
| HPLC Separation | | | | | | |
| Saturates, wt % | 89.8 | 62.9 | 62.0 | 63.6 | 68.0 | 83.7 |
| Aromatics, wt % | 9.8 | 36.2 | 35.5 | 36.3 | 31.5 | 15.5 |
| Recovery, wt % | 99.5 | 99.0 | 97.5 | 99.9 | 99.5 | 99.3 |

TABLE 4

OPERATING CONDITIONS, YIELDS AND PRODUCT INSPECTIONS, MCSU

| | | | | | |
|---|---|---|---|---|---|
| Unit Run # | \multicolumn{5}{c}{MCS-113-3} | | | | |
| Catalyst Description | \multicolumn{5}{c}{Ni/WS (from sulphide)} | | | | |
| Unit Conditions | | | | | |
| Feed | \multicolumn{5}{c}{600N 82 VI Raffinate} | | | | |
| Feed Rate (LHSV) | \multicolumn{5}{c}{1.0} | | | | |
| Gas Rate, SCF/B | \multicolumn{5}{c}{6200} | | | | |
| Reactor Temp., °C. | 340 | 375 | 375 | 375 | 380 |
| Unit Pressure, MPa | \multicolumn{5}{c}{8.5} | | | | |
| Catalyst Hours | 8–12 | 15–19 | 22–26 | 29–33 | 36–40 |
| Total Liquid Product | | | | | |
| TLP Yield, wt % | 96.1 | 97.8 | 96.2 | 94.9 | 96.6 |
| 360° C. + Yield on Feed, wt % | 94.1 | 87.4 | 84.6 | 82.8 | 79.0 |
| Refractive Index @ 75° C. | 1.4744 | 1.4662 | 1.4657 | 1.4658 | 1.4626 |
| Hydrogen, wt % by NMR | — | — | | | |
| 360° C. + Liquid Product | | | | | |
| Visc @ 40° C., cSt | 124.2 | 85.17 | 81.5 | 79.75 | 65.75 |
| @ 100° C., cSt | 12.45 | 10.21 | 9.97 | 9.86 | 8.93 |
| Viscosity Index | 90 | 100 | 102 | 102 | 110 |
| Dohrman Sulphur, wppm | — | | | | 160 |
| X-Ray Sulphur, wt % | 0.677 | 0.091 | 0.071 | 0.089 | — |
| Total Nitrogen, wppm | 128 | — | | | |
| HPLC Separation | | | | | |
| Saturates, wt % | 58.9 | 73.6 | 74.7 | 72.4 | 80.2 |
| Aromatics, wt % | 37.6 | 25.6 | 23.9 | 25.9 | 19.0 |
| Recovery, wt % | 96.5 | 99.2 | 98.6 | 98.4 | 99.2 |

TABLE 5

OPERATING CONDITIONS, YIELDS AND PRODUCT INSPECTIONS, MSCU

| | |
|---|---|
| Unit Run # | MCS-105-8 |
| Catalyst Description | CoMo (from oxide) |
| Unit Conditions | |
| Feed | 600N 82 VI Raffinate |
| Feed Rate (LHSV) | 1.0 |

TABLE 5-continued

OPERATING CONDITIONS, YIELDS AND PRODUCT INSPECTIONS, MSCU

| | | | | | | | | |
|---|---|---|---|---|---|---|---|---|
| Gas Rate, SCF/B | | | | 6200 | | | | |
| Reactor Temp., °C. | 340 | 340 | 340 | 350 | 350 | 350 | 350 | 350 |
| Unit Pressure, MPa | | | | 8.5 | | | | |
| Catalyst Hours | 7–11 | 14–18 | 21–25 | 28–32 | 35–39 | 41–44 | 54–57 | 64–67 |
| Total Liquid Product | | | | | | | | |
| TLP Yield, wt % | 95.7 | 98.8 | 96.6 | 98.3 | | 98.4 | 98.8 | 98.8 |
| 360° C. + Yield on Feed, wt % | 83.4 | 94.8 | 94.3 | 94.0 | — | 95.2 | 95.4 | 97.5 |
| Refractive Index @ 75° C. | 1.4622 | 1.4680 | 1.4695 | 1.4672 | — | 1.4672 | 1.4679 | |
| Hydrogen, wt % by NMR | — | | | | | — | | |
| 360° C. + Liquid Product | | | | | | | | |
| Visc @ 40° C., cSt | 68.74 | 102.4 | 107.59 | 96.05 | | 96.31 | 98.34 | 86.31 |
| @ 100° C., cSt | 9.08 | 11.28 | 11.50 | 10.81 | — | 10.82 | 10.95 | 10.21 |
| Viscosity Index | 107 | 96 | 93 | 95 | | 95 | 95 | 99 |
| Dohrman Sulphur, wppm | 58 | 440 | 570 | 160 | 160 | 290 | 185 | 140 |
| X-Ray Sulphur, wt % | — | — | — | — | — | — | — | — |
| Total Nitrogen, wppm | — | 10 | 25 | 5 | | 6 | 6 | <5 |
| Basic Nitrogen, wppm | — | — | — | — | — | — | — | — |
| HPLC Separation | | | | | | | | |
| Saturates, wt % | 80.0 | 62.7 | 64.6 | 64.7 | 67.7 | 67.0 | 66.5 | 69.3 |
| Aromatics, wt % | 18.9 | 32.2 | 34.0 | 28.4 | 30.5 | 30.2 | 28.3 | 29.6 |
| Recovery, wt % | 98.9 | 94.9 | 98.6 | 93.0 | 98.2 | 97.1 | 94.8 | 98.9 |

TABLE 6

OPERATING CONDITIONS, YIELDS AND PRODUCT INSPECTIONS, MCSU

| | | | | | | |
|---|---|---|---|---|---|---|
| Unit Run # | | | MSC-111-9 | | | |
| Catalyst Description | | | $Ni_{0.5}Mn_{0.5}Mo$ (from sulphide) | | | |
| Unit Conditions | | | | | | |
| Feed | | | 600N 82 VI Raffinate | | | |
| Feed Rate (LHSV) | | | 1.0 | | | |
| Gas Rate, SCF/B | | | 6200 | | | |
| Reactor Temp., °C. | 330 | 340 | 340 | 360 | 360 | 375 |
| Unit Pressure, MPa | | | 8.5 | | | |
| Catalyst Hours | 5–8 | 12–15 | 19–22 | 26–29 | 33–36 | 40–43 |
| Total Liquid Product | | | | | | |
| TLP Yield, wt % | 96.8 | 97.8 | 98.6 | 96.6 | 98.0 | 96.5 |
| 360° C. + Yield on Feed, wt % | 95.7 | 97.3 | 98.1 | 96.1 | 97.4 | 95.3 |
| Refractive Index @ 75° C. | 1.4720 | 1.4717 | 1.4716 | 1.4698 | 1.4695 | 1.4677 |
| Hydrogen, wt % by NMR | — | | | | | |
| 360° C. + Liquid Product | | | | | | |
| Visc @ 40° C., cSt | 115.72 | 112.94 | 110.34 | 103.17 | 101.41 | 89.85 |
| @ 100° C., cSt | 11.98 | 11.77 | 11.70 | 11.32 | 11.09 | 10.43 |
| Viscosity Index | 91 | 91 | 93 | 95 | 94 | 98 |
| Dohrman Sulphur, wppm | — | | | 640 | 530 | 260 |
| X-Ray Sulphur, wt % | 0.20 | 0.16 | 0.15 | — | — | — |
| Total Nitrogen, wppm | 170 | 150 | 150 | 87 | 67 | 37 |
| Basic Nitrogen, wppm | — | | | | — | |
| HPLC Separation | | | | | | |
| Saturates, wt % | 62.5 | 62.8 | 60.3 | 66.7 | 66.9 | 67.1 |
| Aromatics, wt % | 36.6 | 36.0 | 34.9 | 32.8 | 30.6 | 27.7 |
| Recovery, wt % | 99.1 | 98.7 | 95.2 | 99.5 | 97.5 | 94.8 |

TABLE 7

OPERATING CONDITIONS, YIELDS AND PRODUCT INSPECTIONS, MCSU

| | | | | | | | | |
|---|---|---|---|---|---|---|---|---|
| Unit Run # | | | | MCS-111-10 | | | | |
| Catalyst Description | | | | $Ni_{0.5}Cr_{0.5}Mo$ (from sulphide) | | | | |
| Unit Conditions | | | | | | | | |
| Feed | | | | 600N 82 VI Raffinate | | | | |
| Feed Rate (LHSV) | | | | 1.0 | | | | |
| Gas Rate, SCF/B | | | | 6200 | | | | |
| Reactor Temp., °C. | 325 | 340 | 340 | 350 | 350 | 350 | 355 | 345 |
| Unit Pressure, MPa | | | | 8.5 | | | | |
| Catalyst Hours | 11–14 | 18–21 | 25–28 | 32–35 | 39–42 | 46–49 | 53–56 | 60–63 |
| Total Liquid Product | | | | | | | | |
| TLP Yield, wt % | 97.8 | 98.5 | 96.6 | 93.8 | 93.2 | 93.3 | 93.5 | 94.3 |
| 360° C. + Yield on Feed, wt % | 97.1 | 97.6 | 93.2 | 82.9 | 79.1 | 79.2 | 79.3 | 83.7 |
| Refractive Index @ 75° C. | 1.4707 | 1.4079 | 1.4661 | 1.4604 | 1.4555 | 1.4567 | 1.4561 | 1.4594 |
| Hydrogen, wt % by NMR | — | | | | | | — | |
| 360° C. + Liquid Product | | | | | | | | |
| Visc @ 40° C., cSt | 106.07 | 88.89 | 85.42 | 67.50 | 56.70 | 57.60 | 56.68 | 64.85 |
| @ 100° C., cSt | 11.38 | 10.30 | 10.11 | 9.05 | 8.13 | 8.20 | 8.16 | 8.81 |
| Viscosity Index | 92.8 | 96.6 | 98.2 | 109.1 | 111.9 | 111.4 | 112.9 | 109.3 |
| Dohrman Sulphur, wppm | 58 | 440 | 570 | 160 | 160 | 290 | 185 | 140 |
| X-Ray Sulphur, wt % | 0.25 | | | | | | | 47 |

TABLE 7-continued

| OPERATING CONDITIONS, YIELDS AND PRODUCT INSPECTIONS, MCSU | | | | | | | | |
|---|---|---|---|---|---|---|---|---|
| Total Nitrogen, wppm | 44 | 13 | 5 | — | — | — | — | — |
| Basic Nitrogen, wppm | — | — | — | — | — | — | — | — |
| HPLC Separation | | | | | | | | |
| Saturates, wt % | 65.8 | 63.8 | 69.0 | 79.8 | 88.7 | 84.5 | 85.8 | 83.0 |
| Aromatics, wt % | 35.2 | 35.7 | 31.1 | 18.8 | 10.1 | 12.3 | 10.1 | 16.0 |
| Recovery, wt % | 101.0 | 99.4 | 100.1 | 98.6 | 98.8 | 96.8 | 95.9 | 99.0 |

What is claimed is:

1. A method for increasing the Viscosity Index of lubricating and specialty oils by contacting with a catalyst, said method comprising contacting a lube and/or specialty oil stock under hydrotreating conditions with a specific bulk metal sulfide hydrotreating catalyst selected from the group consisting of bulk Cr/Ni/Mo sulfide catalyst, bulk Ni/Mo/Mn sulfide catalyst and mixtures thereof, wherein the Cr/Ni/Mo sulfide catalyst is prepared by the decomposition in a sulfide containing atmosphere at a temperature of at least 150° C. of a $[Ni(L)_3](Cr(L)_3)$-$[MoS_4]_{2-2.5}$ precursor complexes and the Ni/Mo/Mn sulfide catalyst is prepared by the decomposition in inert atmosphere at 300°–400° C. followed by sulfiding using $H_2S/H_2$ at 200°–600° C. of a $[Ni(L)_3](Mn(L)_3)[MoO_4]_2$ precursor complex where L is one or more neutral, nitrogen containing ligand, at least one of which is a chelating polydentate ligand.

2. The method of claim 1 wherein hydrotreating conditions comprise temperature in the range 200° to 450° C., pressure in the range 300 to 3000 psi, space velocity in the range of about 0.1 to 5.0 v/v/hr and a treat gas rate in the range of about 200 to 20,000 SCF $H_2$/bbl.

3. The method of claim 2 wherein the ligand is ethylene diamine.

4. The method of claim 1 or 2 wherein the bulk metal sulfide catalyst is used in the form of pellets made by compacting bulk metal sulfide under pressure.

* * * * *